INVENTOR.
George W. Jackson

United States Patent Office 3,039,760
Patented June 19, 1962

1

3,039,760
SHOCK ABSORBER AND AIR SPRING UNIT ASSEMBLY
George W. Jackson, Dayton, Ohio, assignor to General Motors Corporation, Detroit, Mich., a corporation of Delaware
Filed Aug. 30, 1960, Ser. No. 52,949
6 Claims. (Cl. 267—64)

This invention relates to a combination shock absorber and supplementary air spring unit assembly that is adapted to be placed between the sprung mass and the unsprung mass of a vehicle in the same position normally occupied by a conventional direct acting shock absorber as disposed adjacent the main suspension spring for a vehicle, the supplementary air spring unit, when pressurized with a pressure fluid, such as air, aiding the main spring in support of the sprung mass of the vehicle on the unsprung mass.

The combination air spring and shock absorber unit may be positioned adjacent each of the respective main springs of the vehicle, if desired, but they are used primarily adjacent the two rear springs of the vehicle to aid the rear springs in support of the body on axle assembly to prevent sagging of the rear end of the vehicle when a heavy load is carried in the vehicle. The air spring portion of the combination shock absorber and air spring unit is constructed and arranged in a manner that the air spring will not cause any substantial change in ride effect that is normally engineered into the spring suspension for the vehicle either when the air spring is pressurized or when it is collapsed and is not being used as a spring suspension aid. Whenever a load is carried in the vehicle that tends to cause sagging at the rear of the vehicle, the air spring can be supplied with air or other suitable gas under pressure to aid or work in parallel with the main suspension spring so as to increase the overall load carrying capacity of the suspension system without "bottoming" of the vehicle and to maintain the vehicle in a level condition relative to the road.

To conserve space and to reduce cost of the air spring portion of the combination air spring and shock absorber unit, it is proposed to form a part of the air spring unit around the reservoir tube of a conventional direct action shock absorber by using a metal tubular wall as a part of the wall structure of the air spring and to utilize a flexible tubular wall structure as a second portion of the air spring, the tubular form of the air spring conserving the space requirement for installation of the combination shock absorber and air spring unit. When such a unit is reciprocated in the normal operation of the shock absorber and the air spring is not pressurized, the flexible walls of the air spring unit tend to collapse upon one another with the outer wall of the unit collapsing upon the inner wall in its reciprocal movement and thereby engaging the inner wall of the air spring unit as well as the reservoir tube of the shock absorber that forms a support for the inner wall of the flexible tubular structure of the air spring unit.

When the flexible wall portion of the air spring unit operates under the collapsed condition, that is when the pressure in the air spring unit is substantially at atmosphere, or less than atmosphere, the flexible wall tends to creep between the rigid tubular portion of the air spring unit and the reservoir tube on which the wall

2 structure is supported, which effect causes damage to the flexible wall structure of the air spring unit.

It is therefore an object of this invention to provide a combination shock absorber and air spring unit wherein the air spring unit has a part of its wall structure formed from a rigid metal tube that reciprocates relative to the reservoir tube of the direct acting shock absorber with a flexible tubular wall extending between the reservoir tube of the shock absorber and the rigid tubular wall of the air spring unit to close one end of the pressurizing chamber of the air spring unit, the rigid tubular wall structure of the air spring unit having its open or free end formed inwardly toward the reservoir tube of the shock absorber in a continuously diminishing radius with the terminus end as the end of the rigid metal tube of the air spring unit being positioned closely adjacent the inner wall of the air spring unit so that the flexible wall portion that is supported at the end of the rigid wall portion of the air spring unit will not be caught between the end of the rigid wall portion of the air spring unit and the inner wall of the pressurizing chamber for the air spring unit, and thereby eliminate damage to the flexible wall of the air spring unit.

Further objects and advantages of the present invention will be apparent from the following description, reference being had to the accompanying drawings wherein preferred embodiments of the present invention are clearly shown.

Figures 1, 2:
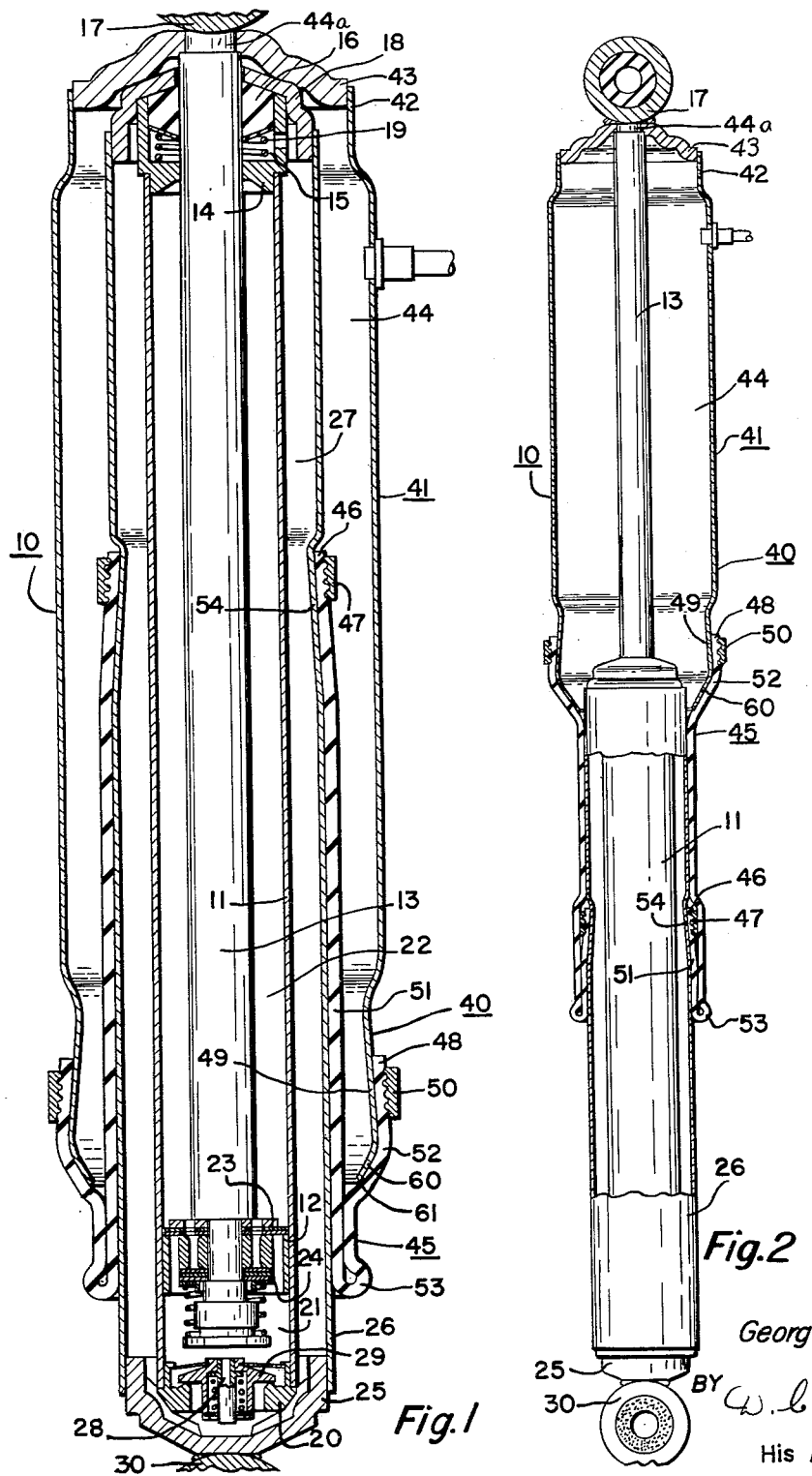
FIG. 1 is a longitudinal cross sectional view of a shock absorber and auxiliary air spring unit incorporating features of this invention.
FIG. 2 is an elevaional view of the shock absorber, partially in cross section, illustrating the device in full extended position.

In this invention, in FIG. 1, there is illustrated a shock absorber and an air spring unit assembly that is adapted to be placed between the sprung mass and the unsprung mass of a vehicle in the same location that is normally occupied by a conventional shock absorber placed adjacent the main suspension spring of a vehicle. The shock absorber, which is of the direct acting type, will function in its normal manner to damp movements of the sprung mass and the unsprung mass of the vehicle relative to one another without any substantial interference from the air spring unit portion of the assembly either when the air spring is pressurized, under which condition it will aid the main spring in supporting the sprung mass on the unsprung mass, or when it is not pressurized.

When the air spring unit of the combination shock absorber and air spring unit assembly is pressurized with a suitable pressure fluid, such as air, the air spring unit will aid the main suspension spring to support the sprung mass of the vehicle to prevent sagging of the vehicle when a heavy load is carried in the vehicle, the arrangement being such that substantially a level condition is maintained between the vehicle and the road since the shock absorber and the air spring unit assembly works as a unit assembly between the sprung mass and the unsprung mass of the vehicle.

The shock absorber 10 consists of a pressure cylinder 11 having a valved piston 12 carried on the end of a reciprocating rod 13. The reciprocating rod 13 extends through a rod guide member 14 at one end of the cylinder 11, the rod guide member 14 having a rod seal chamber 15 that receives a rod seal 16 engaging the rod and sealing against loss of hydraulic fluid from within the shock absorber pressure cylinder 11. The projecting end of the rod 13 carries a fitting 17 for attachment of the rod to the sprung mass or chassis frame of the vehicle to attach this end of the shock absorber to the vehicle. The seal chamber 15 is closed by cap member 18 that also holds the rod seal 16 within the chamber 15. A spring 19 in the chamber 15 holds the rod seal 16 under resilient pressure.

The bottom end of the cylinder 11 is closed by a base valve structure 20 whereby a compression chamber 21 is formed between the base valve 20 and the piston 12. A rebound chamber 22 is formed between the piston 12 and the rod guide 14.

The piston 12 is provided with a compression control valve 23 on one side of the piston to regulate flow of hydraulic fluid from the chamber 21 into the chamber 22 on movement of the piston 12 toward the base valve 20. On the opposite side of the piston 12 there is provided a rebound control valve 24 to control flow of hydraulic fluid from chamber 22 into chamber 21 when the piston moves upwardly away from the base valve 20. The base valve 20 is carried in a closure cap 25 that is secured within one end of a reservoir tube 26 surrounding the cylinder tube 11 and spaced from the cylinder tube. The upper end of the reservoir tube 26 is fixedly attached to the closure cap 18, thereby providing a closed fluid reservoir chamber space 27 between the pressure cylinder tube 11 and the reservoir tube 26.

The base valve 20 has a valve member 28 that controls flow of hydraulic fluid from the compression chamber 21 into the reservoir chamber 27 on movement of the piston 12 toward the base valve 20. The base valve also includes a valve member 29 that provides for relatively free flow of hydraulic fluid from the reservoir chamber 27 back into the compression chamber 21 on movement of the piston 12 away from the base valve.

The closure cap 25 carries a fitting 30 for attachment of the lower end of the shock absorber to the unsprung mass of the wheel and axle structure of the vehicle, the fitting members 30 and 17 thereby attaching and locating the shock absorber and air spring unit assembly between the sprung mass and the unsprung mass of the vehicle adjacent the main suspension spring of the vehicle so that the shock absorber 10 can function normally to provide for damped relative movement between the sprung mass and the unsprung mass of the vehicle and the air spring unit of the assembly can aid the main suspension spring in support of the vehicle when the air spring unit is pressurized.

The air spring unit assembly 40 of the combination structure includes a rigid metal tubular member 41 that is positioned around the reservoir tube 26 and is coaxial therewith. The upper end 42 of the tubular member 41 is attached to a cap member 43 which in turn is supported on the extending end 44a of the rod 13, the joints between the cap 43 and the rod 44a as well as the end 42 being fluid tight joints so that the chamber space 44 provided between the tube 41 and the reservoir tube 26 can receive and retain a fluid under pressure, such as air, or other suitable gas.

The chamber space 44 has its lower end, or open end, closed by a resilient flexible tubular wall structure 45 that has an end portion 46 attached to the reservoir tube 26 in a fluid tight manner by means of a non-expansible metal ring 47. The wall structure 45 also has the end portion 48 that is attached to the lower end portion 49 of the tubular member 41 in a fluid tight manner by means of a non-expansible ring 50.

The flexible resilient wall structure 45 includes an inner wall 51 that is sleeved over the reservoir tube 26 with the end portion 46 attached in the manner heretofore described. The wall structure 45 also includes an outer wall portion 52 that has the end portion 48 attached to the bottom end of the tubular member 41 in the manner heretofore described. The inner wall 51 and the outer wall 52 of the flexible tubular wall structure 45 are interconnected by means of a return bend portion 53 that is formed from the inner wall or the outer wall of the structure 45, respectively, during reciprocation of the tubular member 41 and the wall structure 45 relative to the reservoir tube 26 when the rod 13 reciprocates the piston 12 in the pressure cylinder 11.

The tubular wall 41 that forms a part of the air spring unit assembly has an axial length that is at least equal to the stroke of reciprocation of the piston 12 but is not greater than the length of the reservoir tube 26 so that the rigid wall 41 forms a major part of the wall structure of the air spring unit with the resilient flexible wall structure 45 closing the open end of the chamber 44 and providing for reciprocation of the tubular member 41 in the full stroke of operation of the shock absorber, the return bend portion 53 of the resilient wall structure 45 moving up and down along the inner wall 51 of the structure 45 and the reservoir tube 26 when the outer wall 52 passes over the attachment 47, as more particularly shown in FIG. 2.

The wall portion 54 of the reservoir tube 26 that is engaged by the end portion 46 of the wall structure 45 as well as the wall portion 49 that is engaged by the end portion 48 of the flexible wall structure are tapered in the form of truncated cones so that fluid pressure applied internally in the chamber 44 tending to move the flexible wall structure 45 axially on the shock absorber will cause the friction retaining rings 47 and 50 to grip the end portions 46 and 48 more tightly in proportion to the pressure existing in the chamber 44.

It has been found that when a tubular flexible and resilient wall structure 45, such as that illustrated in the drawings, is used as the part of the air spring unit assembly, the outer wall portion 52, that is the inner surface thereof, engages the outer surface of the inner wall 51, as shown in FIGS. 1 and 2. This occurs when fluid pressure in the chamber 44 is substantially atmospheric pressure, or less than atmospheric pressure. The chamber 44 is at atmospheric pressure or less than atmosphere, or not substantially greater than atmosphere whenever the air spring unit is de-pressurized for operating the vehicle under normal or light load conditions, under which conditions the assistance of the air spring unit to aid the main suspension spring of the vehicle to support the sprung mass is not normally required. Under this deflated, or de-pressurized operating condition, the inner and outer walls 51 and 52 will engage one another during the reciprocation of the normal functioning of the shock absorber which causes reciprocation of the tubular member 41 relative to the reservoir tube 26.

Under this condition, if the tubular member 41 is a cylindrical member of uniform diameter from end to end, or if the lower end portion of the tubular member 41 is spaced a substantial distance away from the reservoir tube 26, and relative to the wall 51, the outer wall 52 of the flexible tubular wall structure 45 tends to fold under the lower end of the tubular member 41 and recede into the chamber 44, thereby damaging the wall structure of the tubular structure 45 to make it ineffective to hold air or fluid under pressure.

In this invention the lower end portion 60 of the tubular member 41 is formed inwardly toward the reservoir tube 26 in a continuously diminishing radius, or diameter, so that the terminus end 61 is spaced closely adjacent the inner wall 51 of the tubular wall structure 45 when the shock absorber is in complete collapsed position as shown in FIG. 1. When the shock absorber is in fully extended position, as shown in FIG. 2, the terminus end 61 is spaced from the reservoir tube 26, at the upper end thereof, a slightly greater distance than when it is in the position shown in FIG. 1, but in either instance the clearance between the terminus end 61 and the reservoir tube 26, with the shock absorber in the position shown in FIG. 2, or with the terminus end in the position shown in FIG. 1, is insufficient to allow the flexible wall, and particularly the outer wall 52, from being caught between the tubular member 41 and the reservoir tube 26 or the wall member 51 supported thereby from the wall structure as reciprocated in normal operation of the shock absorber with the air chamber 44 being deflated or exhausted, the air pressure being substantially at atmosphere.

A small amount of lubricant is added within the chamber 44 to allow the wall surfaces of the wall members 51 and 52 to slide relative to one another and relative to the reservoir tube 26. One of the silicon lubricants is satisfactory for this purpose.

While the embodiments of the present invention as herein disclosed, constitute preferred forms, it is to be understood that other forms might be adopted.

What is claimed is as follows:

1. A shock absorber and air spring unit assembly, comprising, a hydraulic direct acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and extending beyond the opposite ends of said tubes, wall means closing said opposite ends and through which said rod slidably extends, an elongated rigid tubular member having a closure wall at one end thereof secured on said extending end of said rod concentrically with said rod and positioned concentrically around said reservoir tube with the opposite end of said tubular member being an open end and with the tubular member spaced from said reservoir tube to provide therewith an open ended chamber, said rigid tubular member having an axial length at least equal to the stroke of reciprocation of said piston in said pressure cylinder but not greater than the axial length of said reservoir tube, and a resilient tubular wall unit having an inner tubular wall sleeved on the exterior surface periphery of said reservoir tube with the free end thereof attached to said reservoir tube in fluid tight engagement and an outer tubular wall sleeved on the exterior surface periphery of said open end of said rigid tubular member with the free end thereof attached to said rigid tubular member in fluid tight engagement whereby to close said open end of said chamber for receiving therein fluid under pressure, said open end of said rigid tubular member having the end portion thereof within said outer tubular wall formed inwardly toward said reservoir tube with the terminus end thereof positioned closely adjacent said inner wall of said resilient tubular wall unit when thereadjacent but spaced therefrom thereby partially closing said open end of said rigid tubular member to prevent said outer wall of said resilient tubular unit entering said open ended chamber space during reciprocation of said rigid tubular member and the walls of said resilient tubular unit relative to said reservoir tube.

2. A shock absorber and air spring unit assembly, comprising, a hydraulic direct acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and extending beyond the opposite ends of said tubes, wall means closing said opposite ends and through which said rod slidably extends, an elongated rigid tubular member having a closure wall at one end thereof secured on said extending end of said rod concentrically with said rod and positioned concentrically around said reservoir tube with the opposite end of said tubular member being an open end and with the tubular member spaced from said reservoir tube to provide therewith an open ended chamber, said rigid tubular member having an axial length at least equal to the stroke of reciprocation of said piston in said pressure cylinder but not greater than the axial length of said reservoir tube, and a resilient tubular wall unit having an inner tubular wall sleeved on the exterior surface periphery of said reservoir tube with the free end thereof attached to said reservoir tube in fluid tight engagement and an outer tubular wall sleeved on the exterior surface periphery of said open end of said rigid tubular member with the free end thereof attached to said rigid tubular member in fluid tight engagement whereby to close said open end of said chamber for receiving therein fluid under pressure, said outer wall of said resilient tubular wall unit being collapsed upon said inner wall of said unit and said reservoir tube during reciprocation of said resilient tubular member relative to said reservoir tube and when fluid pressure in said pressure receiving chamber is substantially atmospheric, said open end of said rigid tubular member having the end portion thereof within said outer tubular wall formed inwardly toward said reservoir tube with the terminus end thereof positioned closely adjacent said inner wall of said resilient tubular wall unit and thereadjacent but spaced therefrom thereby partially closing said open end of said rigid tubular member to prevent said outer wall of said resilient tubular unit entering said open ended chamber space during reciprocation of said rigid tubular member and the walls of said resilient tubular unit relative to said reservoir tube with said resilient tubular unit operating under a collapsed condition thereof.

3. A shock absorber and air spring unit assembly constructed and arranged in accordance with that set forth in claim 2 wherein the said formed end portion of said rigid tubular member has a continuously diminishing radius from the maximum diameter of the said end portion to the minimum diameter thereof.

4. A shock absorber and air spring unit assembly constructed and arranged in accordance with that set forth in claim 2 wherein the said formed end portion of said rigid tubular member has a continuously diminishing radius from the maximum diameter of the said end portion to the minimum diameter thereof and extends axially toward said valved end of said pressure cylinder.

5. A shock absorber and air spring unit assembly constructed and arranged in accordance with claim 2 wherein the said formed end of said rigid tubular member has a continuously diminishing radius from the maximum diameter of the said end portion to the minimum diameter thereof arranged in the form of a truncated cone with the apex portion directed toward said valved end of said pressure cylinder.

6. A shock absorber and air spring unit assembly constructed and arranged in accordance with that set forth in claim 2 wherein the said formed end portion of said rigid tubular member has a continuously diminishing radius from the maximum diameter of the said end portion to the minimum diameter thereof and extends axially toward said valved end of said pressure cylinder, and wherein the attachment of said outer wall of said resilient tubular wall unit to said rigid tubular member is positioned immediately adjacent and axially above the said formed end portion of said tubular member.

References Cited in the file of this patent

UNITED STATES PATENTS

| 2,467,098 | Rossman | Apr. 12, 1949 |
| 2,916,296 | Muller | Dec. 8, 1959 |

FOREIGN PATENTS

| 214,922 | Australia | May 2, 1958 |
| 218,802 | Australia | Nov. 21, 1958 |